US012711231B2

(12) United States Patent
Izzo et al.

(10) Patent No.: US 12,711,231 B2
(45) Date of Patent: Aug. 18, 2026

(54) PREVENTING PROFILED SIDE CHANNEL ATTACKS

(71) Applicant: Micron Technology, Inc., Boise, ID (US)

(72) Inventors: Niccolò Izzo, Vignate (IT); Danilo Caraccio, Milan (IT); Luca Castellazzi, Truccazzano (IT)

(73) Assignee: Micron Technology, Inc., Boise, ID (US)

( * ) Notice: Subject to any disclaimer, the term of this patent is extended or adjusted under 35 U.S.C. 154(b) by 264 days.

(21) Appl. No.: 18/511,425

(22) Filed: Nov. 16, 2023

(65) Prior Publication Data

US 2024/0169063 A1 May 23, 2024

Related U.S. Application Data

(60) Provisional application No. 63/384,682, filed on Nov. 22, 2022.

(51) Int. Cl.
*G06F 21/56* (2013.01)

(52) U.S. Cl.
CPC .................................. *G06F 21/566* (2013.01)

(58) Field of Classification Search
CPC .................................................... G06F 21/566
See application file for complete search history.

(56) References Cited

U.S. PATENT DOCUMENTS

2023/0259618 A1 * 8/2023 Veshchikov ............ G06F 21/75
726/23
2024/0031140 A1 * 1/2024 Basso ..................... H04L 9/002

FOREIGN PATENT DOCUMENTS

WO WO-2023147025 A1 * 8/2023 ........... G06F 21/554

OTHER PUBLICATIONS

Cao, "Cross-Device Profiled Side-Channel Attack with Unsupervised Domain Adaptation", IACR Transactions on Cryptographic Hardware and Embedded Systems, pp. 27-56, published Aug. 2021. (Year: 2021).*

* cited by examiner

*Primary Examiner* — Benjamin E Lanier
(74) *Attorney, Agent, or Firm* — Harrity & Harrity, LLP

(57) ABSTRACT

Implementations described herein relate to preventing profiled side channel attacks. A host device may obtain a first profiling configuration that is based on a plurality of keys and one or more characteristics of a first memory device and may obtain a second profiling configuration that is based on the plurality of keys and one or more characteristics of a second memory device. The host device may generate a model based on the first profiling configuration and the second profiling configuration. The host device may initiate or perform a profiled side channel attach using the model.

20 Claims, 6 Drawing Sheets

100

PREVENTING PROFILED SIDE CHANNEL ATTACKS

CROSS-REFERENCE TO RELATED APPLICATION

This patent application claims priority to U.S. Provisional Patent Application No. 63/384,682, filed on Nov. 22, 2022, entitled "PREVENTING PROFILED SIDE CHANNEL ATTACKS," and assigned to the assignee hereof. The disclosure of the prior application is considered part of and is incorporated by reference into this patent application.

TECHNICAL FIELD

The present disclosure generally relates to memory devices, memory device operations, and, for example, to preventing profiled side channel attacks.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
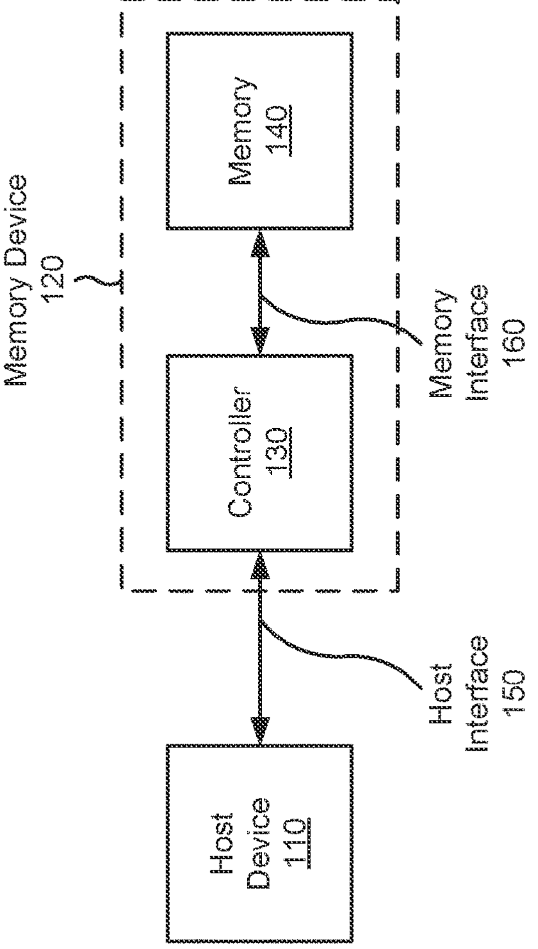
FIG. 1 is a diagram illustrating an example system capable of preventing profiled side channel attacks.

Modern digital systems, ranging from high-performance servers to ultra-lightweight microcontrollers, are universally equipped with cryptographic algorithms which act as the foundation of security, trust, and privacy protocols. Though these primitives are proven to be mathematically secure, poor implementation choices can make them vulnerable to an attacker. The security of these cryptographic algorithms may depend on the secrecy of a key (such as a short key) that provides a computational advantage to the communicating parties over an adversary. For example, a device may receive an input (such as plaintext) and may encrypt the input using a secret key to generate an output (such as cyphertext). In some cases, a brute-force attack on these algorithms may succeed only with negligible probability.

A side channel attack (SCA) is a form of cryptographic attack that intends to break the secret key of the device by utilizing side channel leakage resulting from a physical implementation of the cryptographic algorithm. The side channel leakage can be obtained by monitoring the power consumption of the device running the algorithm, electromagnetic emissions that result from the cryptographic operations, a heat output that results from the cryptographic operations, and/or a time period for the cryptographic operations to be performed, among other examples. The SCA may exploit the correlation (for example, leakage) between the physical variables and the processed data to extract the secret information used in cryptographic processes. In some cases, a profiled SCA may involve the use of a clone device to produce a model of the leakage, which may then be used to attack the actual target device. In the profiling phase, multiple traces from an identical device may be collected with varying sub-keys (such as portions of the cryptographic key) and a model may be built. During the attack phase, the model may be utilized to classify each sub-key of the device under attack.

A first type of profiled SCA (for example, a first profiled SCA) may consider a single device and a single key for both the profiling phase and the attack phase. In this case, the attack success rate may be higher and the time period required for the attack to be performed may be shorter. However, first profiled SCAs do not represent realistic scenarios since they require the attacker to be configured with the key and architecture information of the target device. A second type of profiled SCA (for example, a latest profiled SCA) may consider different devices and different keys between the profiling phase and the attack phase. While this represents a more realistic scenario, the attack success rate for this type of profiled SCA may be lower and the time period for the attack to be performed may be longer.

Some implementations described herein enable profiled side channel attack prevention using a model that allows successful and quick detection of SCAs against a device-key configuration. A host device may obtain a profiling configuration that is based on a plurality of keys and one or more characteristics of a first memory device, and may obtain another profiling configuration that is based on the same plurality of keys and one or more characteristics of a second memory device. The one or more characteristics of the first memory device and the second memory device may respectively correspond to characteristics of the first memory device and the second memory device performing cryptographic operations using the plurality of keys, such as leakage information resulting from the first memory device and the second memory device performing the cryptographic operations. In some examples, the host device may obtain multiple profiling configurations, such as a first profiling configuration that is based on a first key and one or more characteristics of the first memory device, a second profiling configuration that is based on the first key, a second key, and the one or more characteristics of the first memory device, a third profiling configuration that is based on the first key and one or more characteristics of the second memory device, and a fourth profiling configuration that is based on the first key, the second key, and the one or more characteristics of the second memory device. The host device may generate a model based on the profiling configurations, such as the first profiling configuration, the second profiling configuration, the third profiling configuration, and the fourth profiling configuration. The model may be trained using a plurality of keys and a plurality of memory device characteristics associated with the respective memory devices. As a result, the model may be robust and may help to reduce the success rate of future profiled side channel attacks against the memory devices. Additional details are described herein.

FIG. 1 is a diagram illustrating an example system 100 capable of preventing profiled side channel attacks. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the host device 110 may be configured to obtain a first profiling configuration that is based on a plurality of keys and one or more characteristics of a first memory device; obtain a second profiling configuration that is based on the plurality of keys and one or more characteristics of a second memory device; generate a model based on the first profiling configuration and the second profiling configuration; and initiate a profiled side-channel attack using the model.

In some implementations, the host device 110 may be configured to obtain a first profiling configuration that is based on a first key and one or more characteristics of a first memory device; obtain a second profiling configuration that is based on the first key, a second key, and the one or more characteristics of the first memory device; obtain a third profiling configuration that is based on the first key and one or more characteristics of a second memory device; obtain a fourth profiling configuration that is based on the first key, the second key, and the one or more characteristics of the second memory device; and generate a model based on the first profiling configuration, the second profiling configuration, the third profiling configuration, and the fourth profiling configuration.

As indicated above, FIG. 1 is provided as an example. Other examples may differ from what is described with regard to FIG. 1.

Figure 2:
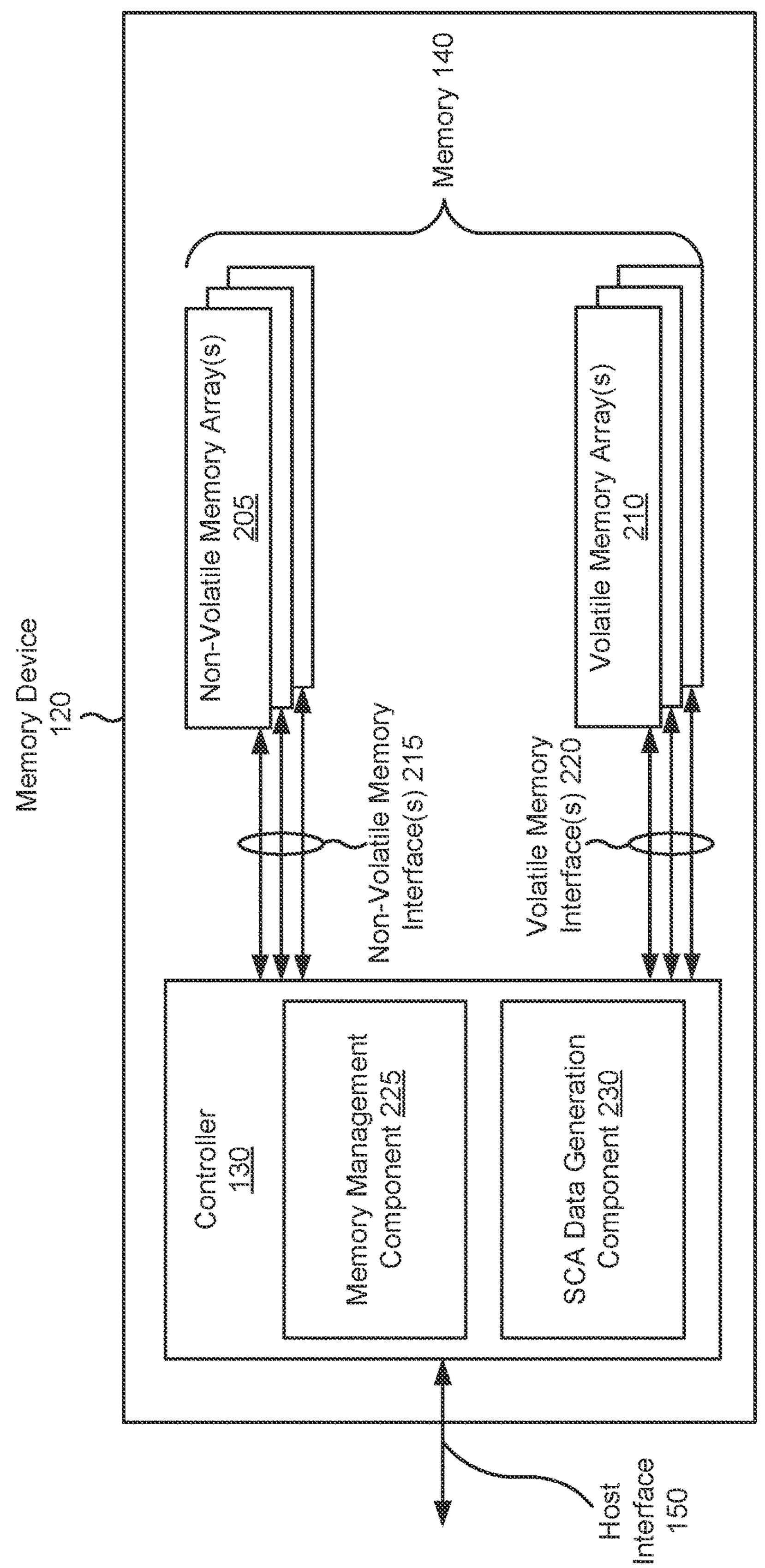
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225 and/or an SCA data generation component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The SCA data generation component 230 may be configured to generate data associated with an SCA. In some implementations, the SCA data generation component 230 may output data based on being attacked by a model. For example, the host device 110 may attack (e.g., test) the memory device 120 using the model, and the SCA data generation component 230 may generate an output based on being attacked by the model. In some implementations, the SCA data generation component 230 may be configured to collect data from the memory device 120. For example, the SCA data generation component 230 may collect power consumption data from the memory device 120 based on the memory device 120 experiencing an SCA and/or based on the memory device 120 being attacked by the model. In some implementations, the SCA data generation component 230 may receive information from the host device 110 that includes one or more countermeasures. The one or more countermeasures may be determined by the host device 110 based on the output by the SCA data generation component 230. The SCA data generation component 230 may use the information that includes the one or more countermeasures to prevent future profiled side channel attacks on the memory device 120.

One or more devices or components shown in FIG. 2 may be configured to perform operations described elsewhere herein, such as one or more operations and/or methods described in connection with FIG. 4. For example, the controller 130, the memory management component 225, and/or the SCA data generation component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
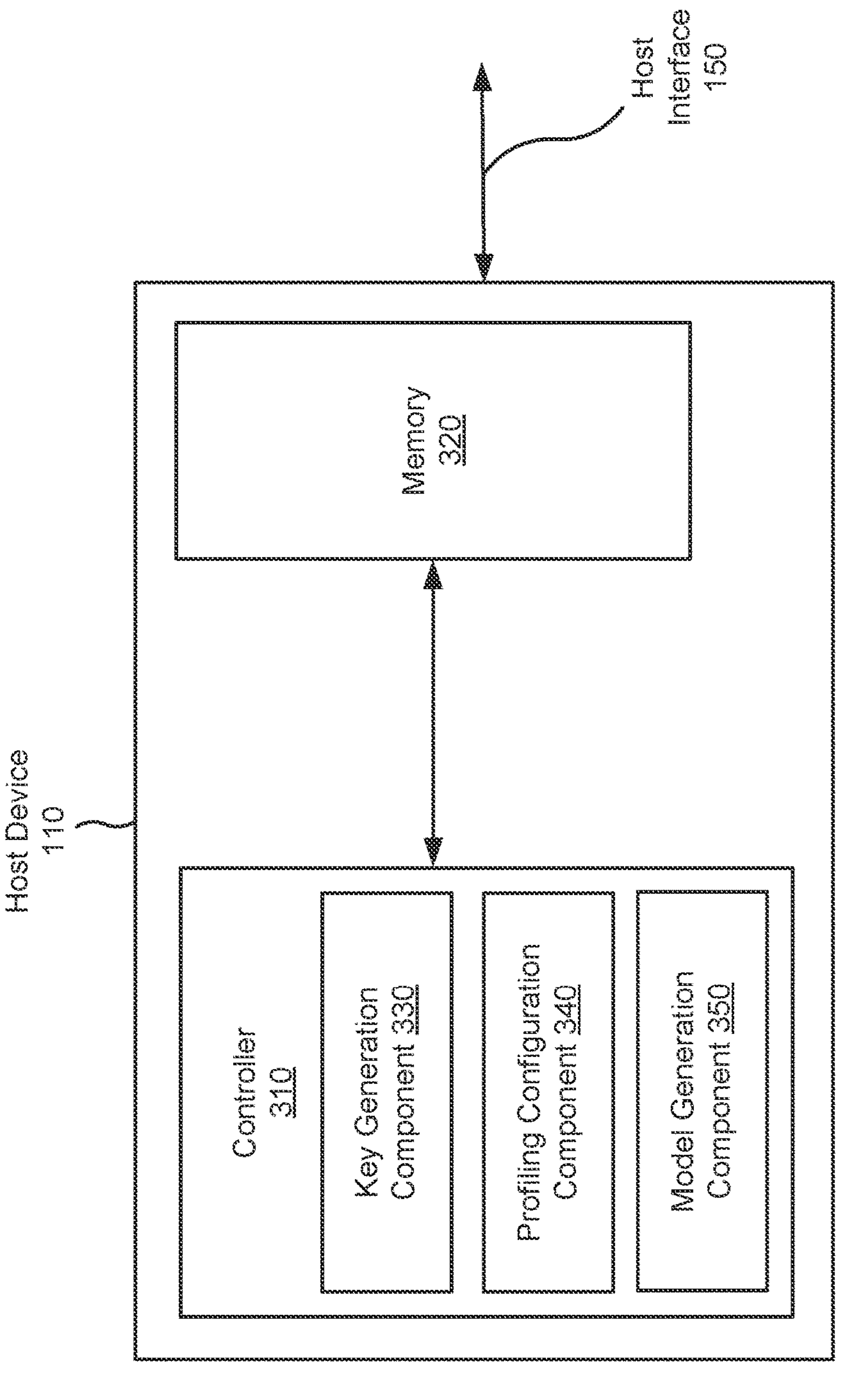
FIG. 3 is a diagram of example components included in a host device.

FIG. 3 is a diagram of example components 300 included in a host device 110. The host device 110 may include a controller 310 and memory 320. The controller 310 associated with the host device 110 may include some or all of the features of the controller 130 associated with the memory device 120. Additionally, or alternatively, the memory 320 associated with the host device 110 may include some or all of the features of the memory 140 associated with the memory device 120.

The controller 310 may control operations of the memory 320, such as by executing one or more instructions. For example, the host device 110 may store one or more instructions in the memory 320, and the controller 310 may execute those one or more instructions. Additionally, or alternatively, the controller 310 may receive one or more instructions from the memory device 120 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 310. The controller 310 may execute the set of instructions to perform one or more operations or methods described herein. In some implementations, execution of the set of instructions, by the controller 310, causes the controller 310 and/or the host device 110 to perform one or more operations or methods described herein. In some implementations, hardwired circuitry is used instead of or in combination with the one or more instructions to perform one or more operations or methods described herein. Additionally, or alternatively, the controller 310 and/or one or more components of the host device 110 may be configured to perform one or more operations or methods described herein.

As shown in FIG. 3, the controller 310 may include a key generation component 330, a profiling configuration component 340 and/or a model generation component 350. In some implementations, one or more of these components are implemented as one or more instructions (e.g., firmware) executed by the controller 310. Alternatively, one or more of these components may be implemented as dedicated integrated circuits distinct from the controller 310.

The key generation component 330 may be configured to generate one or more keys. For example, the key generation component 330 may generate one or more public keys and/or one or more private keys. Using private key encryption, a private key may be shared between two devices and may be used for both encryption of data and for decryption of data. Using public key encryption, one key may be used by a transmitter device to encrypt data and another key may be used by a receiver device to decrypt data. The key generation component 330 may generate the one or more keys using a random key generation function. Thus, the one or more keys may be randomly generated or may be pseudo-randomly generated.

The profiling configuration component 340 may be configured to generate one or more profiling configurations. The profiling configuration(s) may be generated based on one or more keys and/or characteristics of one or more memory devices. For example, the profiling configurations may be generated based on a data input, a data output, one or more keys, and/or side channel leakage information associated with the memory devices 120 performing cryptographic operations using the one or more keys, such as power consumption information, electromagnetic emission information, heat information, or time information, among other examples. In one example, the profiling configuration component 340 may generate a first profiling configuration that is based on a first key and one or more characteristics of a first memory device, a second profiling configuration that is based on the first key, a second key, and the one or more characteristics of the first memory device 120, a third profiling configuration that is based on the first key and one or more characteristics of a second memory device, and a fourth profiling configuration that is based on the first key, the second key, and the one or more characteristics of the second memory device. The profiling configuration may include any number of iterations and may be based on any number of keys and/or any number of devices.

In some implementations, the profiling configuration component 340 may be configured to determine one or more device-key combinations for the profiling phase. For example, the profiling configuration component 340 may determine a number of devices and/or a number of keys that are to be used for the profiling phase. A larger number of memory devices and a larger number of keys may result in a more robust and accurate model, but may require more resources (such as time and processing resources). Alternatively, a smaller number of memory devices and a smaller number of keys may result in a model that detects profiled side channel attacks with less certainty, but may require fewer resources. The profiling configuration component 340 may determine the number of devices and keys based on any number of factors, such as processing capabilities of the devices, a likelihood of the devices being attacked, or past attacks associated with the devices, among other examples. In one example, the profiling configuration component 340 may determine to train two devices using two keys. This may result in four iterations of the model (as described above). Any number of devices and/or any number of keys may be used. In some examples, it may be more desirable to increase the number of keys rather than the number of devices being profiled, as generating additional keys requires fewer resources than increasing the number of devices being profiled.

The model generation component 350 may be configured to generate a model. The model may be based on one or more profiling configurations. In some implementations, the model may be based on multiple profiling configurations. A greater number of profiling configurations may result in a more effective model for preventing future profiled SCAs. For example, each profiling configuration may indicate different responses by different memory devices performing cryptographic operations. In some implementations, the model generation component 350 may be configured to initiate and/or perform a profiled side channel attack on the memory device 120. For example, the model generation component 350 may generate the model, and may attack the memory device 120 using the model (e.g., based on testing the model on the memory device 120) to generate one or more countermeasures for preventing future profiled side channel attacks.

Figure 4:
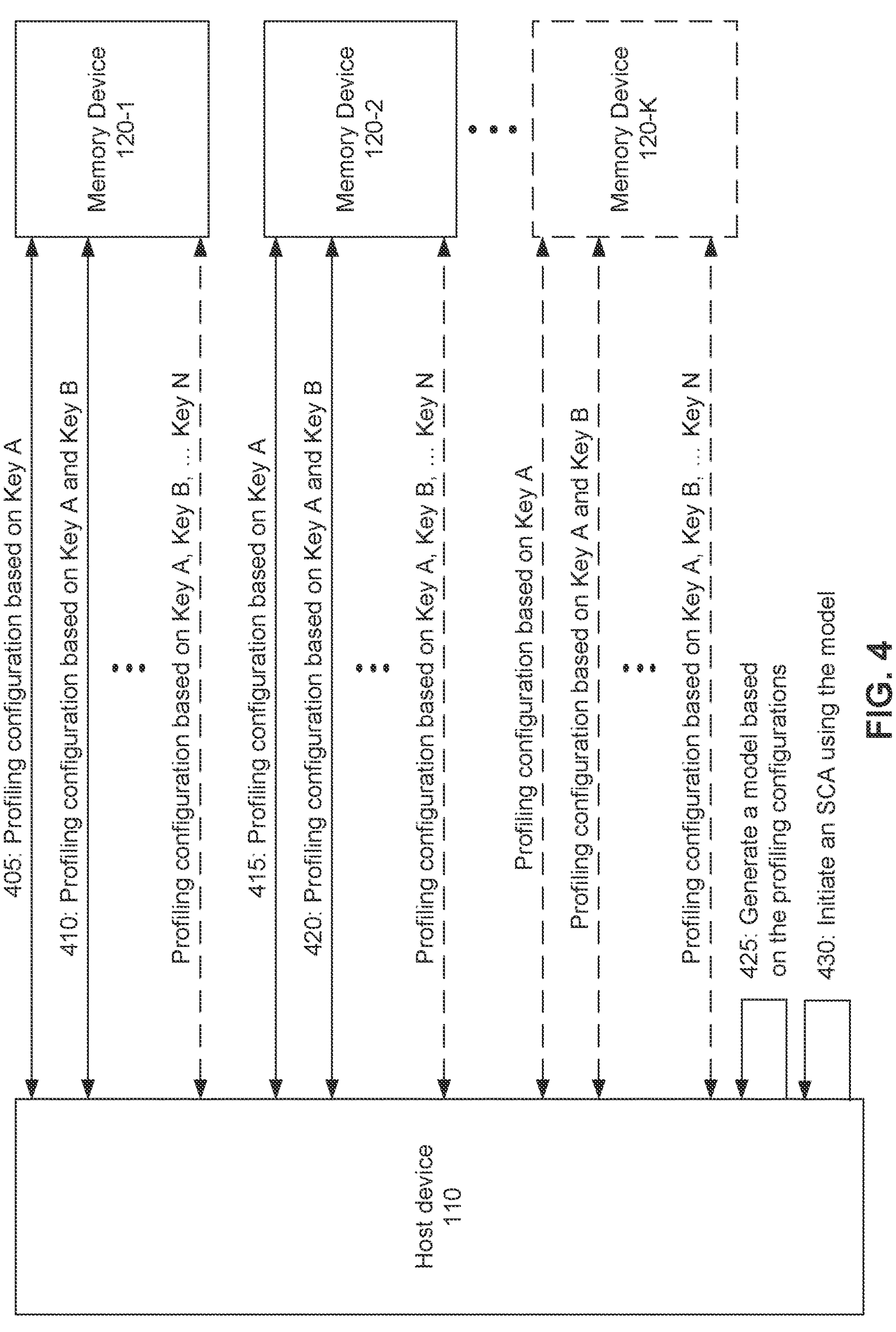
FIG. 4 is a diagram illustrating an example of preventing profiled side channel attacks.
Figure 6:
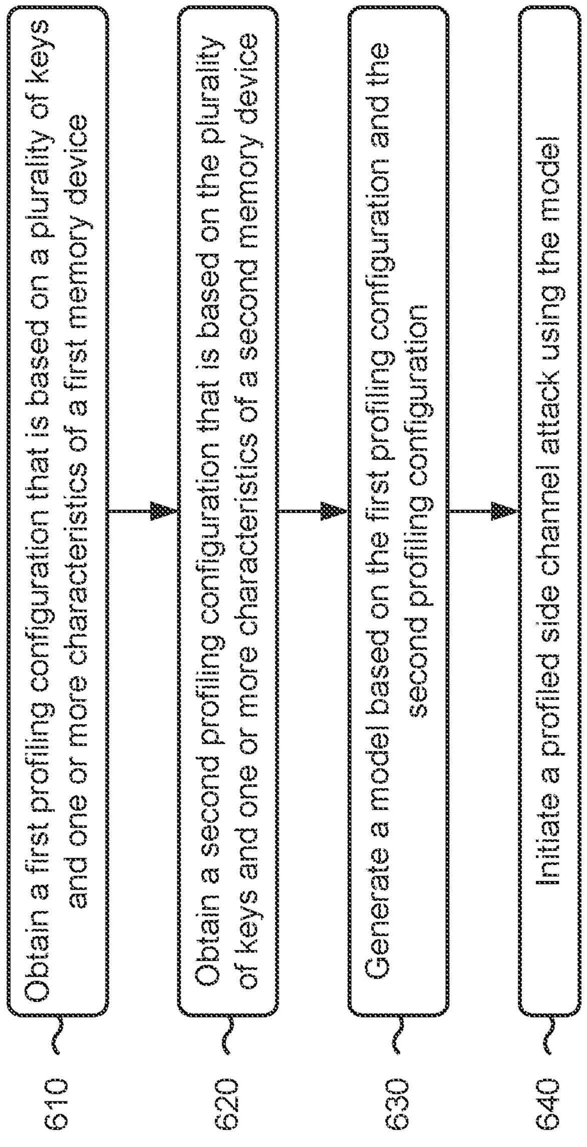
FIG. 6 is a flowchart of an example method associated with preventing profiled side channel attacks.

One or more devices or components shown in FIG. 3 may be used to carry out operations described elsewhere herein, such as one or more operations of FIG. 4 and/or one or more process blocks of the method of FIG. 6. For example, the controller 310, the key generation component 330, the profiling configuration component 340 and/or the model generation component 350 may perform one or more operations and/or methods for the host device 110.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

As indicated above, FIG. 3 is provided as an example. Other examples may differ from what is described with regard to FIG. 3.

FIG. 4 is a diagram illustrating an example 400 of preventing profiled side channel attacks. In some implementations, the host device 110 may be configured to generate a model. The model may be based on a plurality of profiling configurations, where each profiling configuration is associated with a particular device-key combination. Additional details are described below.

As shown by reference number 405, the host device 110 may obtain a first profiling configuration based on a first key (Key A). The first key may be generated based on a random key generation function. The random key generation function may be configured in the host device 110. For example, the random key generation function may be the key generation component 330 or may be included in the key generation component 330. Additionally, or alternatively, the random key generation function may be configured in the first memory device 120-1. In some implementations, the first profiling configuration may be based on the first key and one or more characteristics of the first memory device 120-1. For example, the first profiling configuration may be generated based on the first key and one or more characteristics that result from a profiling of the first memory device 120-1 using the first key. In some implementations, the one or more characteristics may include side channel leakage information associated with the first memory device 120-1, such as power consumption information, electromagnetic emission information, heat information, or time information, among other examples.

As shown by reference number 410, the host device 110 may obtain a second profiling configuration based on the first key (Key A) a second key (Key B). The second key may be generated by the host device 110 based on a random key generation function, such as the same key generation function used to generate the first key or a different key generation function. In some implementations, the second profiling configuration may be based on the first key, the second key, and the one or more characteristics of the first memory device 120-1. For example, the second profiling configuration may be generated based on the first key, the second key, and one or more characteristics that result from a profiling of the first memory device 120-1 using the first key and the second key. In some implementations, the one or more characteristics may include side channel leakage information associated with the first memory device 120-1, such as power consumption information, electromagnetic emission information, heat information, or time information, among other examples.

The host device 110 may be configured to generate any number of profiling configurations associated with the first memory device 120-1 based on any number of keys. In some implementations, the host device 110 may generate N profiling configurations associated with the first memory device 120-1, where each profiling configuration is based on a key corresponding to the current profiling configuration and the previous keys from the prior profiling configurations. For example, a first profiling configuration may be based on a first key, a second profiling configuration may be based on the first key and a second key, profiling configuration N-2 may be based on the first key, the second key, and key N-2, profiling configuration N-1 may be based on the first key, the second key, key N-2, and key N-1, and profiling configuration N may be based on the first key, the second key, key N-2, key N-1, and key N.

As shown by reference number 415, the host device 110 may obtain a third profiling configuration based on the first key (Key A). The first key may be the same first key that was used for the profiling of the first memory device 120-1. In some implementations, the third profiling configuration may be based on the first key and one or more characteristics of the second memory device 120-2. For example, the third profiling configuration may be generated based on the first key and one or more characteristics that result from a profiling of the second memory device 120-2 using the first key. In some implementations, the one or more characteristics may include side channel leakage information associated with the second memory device 120-2, such as power consumption information, electromagnetic emission information, heat information, or time information, among other examples.

As shown by reference number 420, the host device 110 may obtain a fourth profiling configuration based on the first key (Key A) the second key (Key B). The second key may be the same second key that was used for the profiling of the first memory device 120-1. In some implementations, the fourth profiling configuration may be based on the first key, the second key, and the one or more characteristics of the second memory device 120-2. For example, the fourth profiling configuration may be generated based on the first key, the second key, and one or more characteristics that result from a profiling of the second memory device 120-2 using the first key and the second key. In some implementations, the one or more characteristics may include side channel leakage information associated with the second memory device 120-2, such as power consumption information, electromagnetic emission information, heat information, or time information, among other examples.

In some implementations, the host device 110 may generate any number of profiling configurations associated with the second memory device 120-2 based on any number of keys. In some implementations, the host device 110 may generate N profiling configurations associated with the second memory device 120-2, where each profiling configuration is based on a key corresponding to the current profiling configuration iteration and the previous keys from the prior profiling configurations. For example, a first profiling configuration may be based on a first key, a second profiling configuration may be based on the first key and a second key, profiling configuration N-2 may be based on the first key, the second key, and key N-2, profiling configuration N-1 may be based on the first key, the second key, key N-2, and key N-1, and profiling configuration N may be based on the first key, the second key, key N-2, key N-1, and key N.

In some implementations, all memory devices included in the set of memory devices for generating the model may use the same number of keys. For example, memory device 120-1 may use keys A-N for generating a plurality of profiling configurations based on one or more characteristics of the memory device 120-1, memory device 120-2 may use keys A-N for generating a plurality of profiling configurations based on one or more characteristics of the memory device 120-2, and memory device 120-K may use keys A-N for generating a plurality of profiling configurations based on one or more characteristics of the memory device 120-K. In some other implementations, at least one other memory device included in the set of memory devices for generating the model may use a different key than another memory device that is included in the set of memory devices for generating the model.

As shown by reference number 425, the host device 110 may generate a model based on the profiling configurations. In some implementations, the host device 110 may generate the model based on two or more profiling configurations. In some other implementations, the host device 110 may generate the model based on at least four profiling configurations corresponding to a device-key combination that includes at least two devices and at least two keys. For example, the host device 110 may generate the model based on the first profiling configuration (associated with Key A and one or more characteristics of the first memory device 120-1), the second profiling configuration (associated with Key A, Key B, and one or more characteristics of the first memory device 120-1), the third profiling configuration (associated with Key A and one or more characteristics of the second memory device 120-2), and the fourth profiling configuration (associated with Key A, Key B, and one or more characteristics of the second memory device 120-2).

In some implementations, the host device 110 may determine a number of memory devices and/or a number of keys to be used for generating the model. A larger number of memory devices and a larger number of keys may result in a more robust and accurate model, but may require more resources (such as time and processing resources). Alternatively, a smaller number of memory devices and a smaller number of keys may result in a model that detects profiled side channel attacks with less certainty, but may require fewer resources.

As shown by reference number 430, the host device 110 may initiate and/or perform the profiled SCA using the model. For example, the host device 110 may attack one or more memory devices using the model and/or may test the model on the one or more memory devices. In some implementations, the host device 110 may perform the profiled SCA based on attacking the first memory device 120-1 or the second memory device 120-2. Additionally, or alternatively, the host device 110 may perform the profiled SCA based on attacking one or more other memory devices that were not included in the profiling phase.

In some implementations, the host device 110 may determine one or more countermeasures for preventing future profiled side-channel attacks. The host device 110 may determine the one or more countermeasures based on the model, the profiling configurations, and/or data received from the memory devices based on attacking the memory devices using the model. In some implementations, the host device 110 may transmit information that includes the one or more countermeasures. For example, the host device 110 may transmit an indication of the one or more countermeasures to one or more memory devices that were attacked using the model. Additionally, or alternatively, the host device 110 may transmit an indication of the one or more countermeasures to one or more memory devices that were not attacked using the model. The information may be used by the one or more memory devices to prevent future profiled side-channel attacks.

As described herein, a host device may obtain a plurality of profiling configurations associated with a respective plurality of device key combinations. For example, the host device may obtain a first profiling configuration that is based on a first key and one or more characteristics of a first memory device, a second profiling configuration that is based on the first key, a second key, and the one or more characteristics of the first memory device, a third profiling configuration that is based on the first key and one or more characteristics of a second memory device, and a fourth profiling configuration that is based on the first key, the second key, and the one or more characteristics of the second memory device. The host device may generate a model based on the profiling configurations, such as the first profiling configuration, the second profiling configuration, the third profiling configuration, and the fourth profiling configuration. The host device may initiate and/or perform a profiled side channel attack using the model. For example, the host device 110 may test the model based on attacking one or more devices using the model.

As indicated above, FIG. 4 is provided as an example. Other examples may differ from what is described with regard to FIG. 4.

Figure 5:
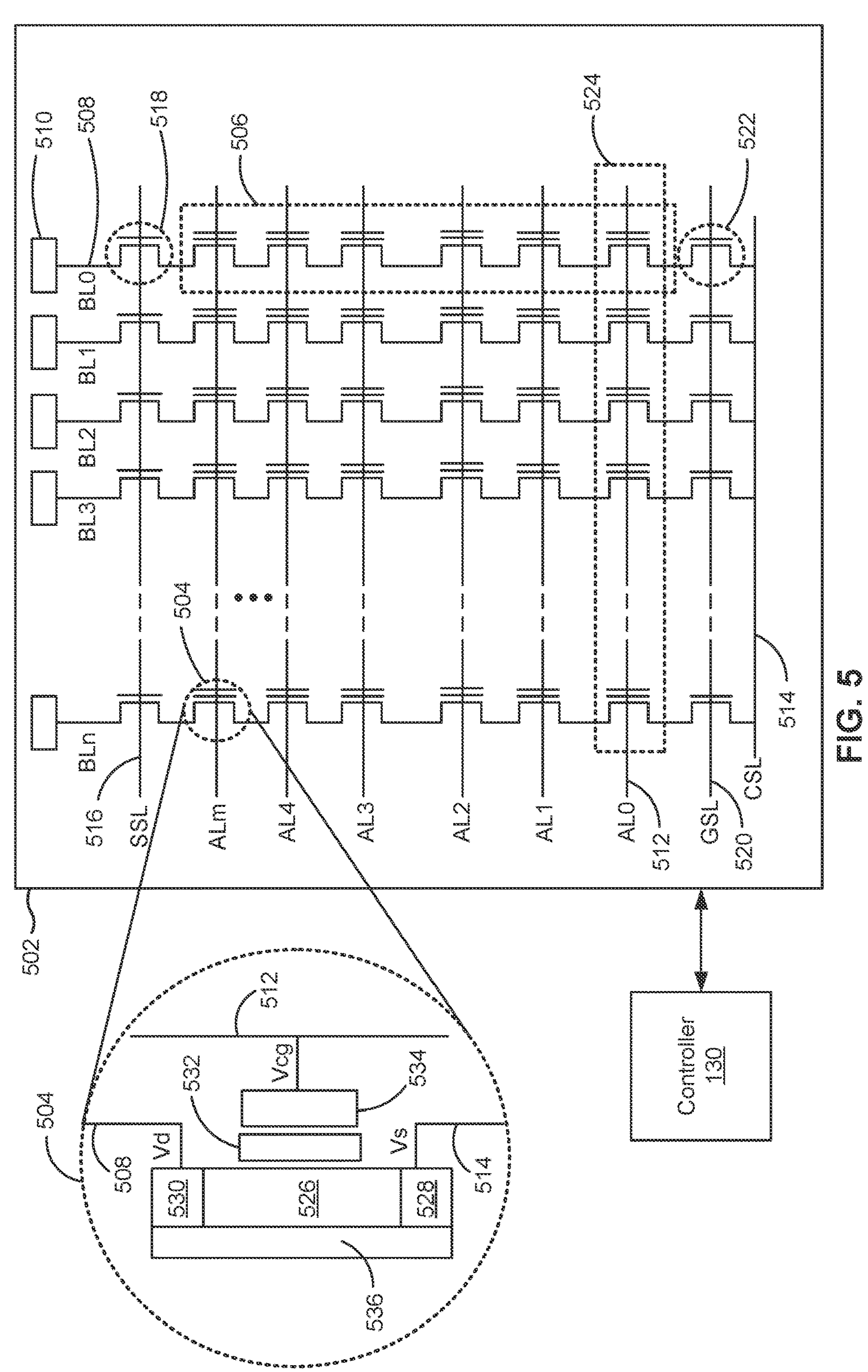
FIG. 5 is a diagram of example components included in a memory device.

FIG. 5 is a diagram of example components included in a memory device 120. As described above in connection with FIG. 1, the memory device 120 may include a controller 130 and memory 140. As shown in FIG. 5, the memory 140 may include a memory array 502, which may correspond to a non-volatile memory array 205 described above in connection with FIG. 2.

In FIG. 5, the memory array 502 is a NAND memory array. However, in some implementations, the memory array 502 may be another type of memory array, such as a NOR memory array, a resistive RAM (RRAM) memory array, a magneto-resistive RAM (MRAM) memory array, a ferroelectric RAM (FeRAM) memory array, a spin-transfer torque RAM (STT-RAM) memory array, or the like. In some implementations, the memory array 502 is part of a three-dimensional stack of memory arrays, such as 3D NAND flash memory, 3D NOR flash memory, or the like.

The memory array 502 includes multiple memory cells 504. A memory cell 504 may store an analog value, such as an electrical voltage or an electrical charge, that represents a data state (e.g., a digital value). The analog value and corresponding data state depend on a quantity of electrons trapped or present within a region of the memory cell 504 (e.g., in a charge trap, such as a floating gate), as described below.

A NAND string 506 (sometimes called a string) may include multiple memory cells 504 connected in series. A NAND string 506 is coupled to a bit line 508 (sometimes called a digit line or a column line, and shown as BLO-BLn). Data can be read from or written to the memory cells 504 of a NAND string 506 via a corresponding bit line 508 using one or more input/output (I/O) components 510 (e.g., an I/O circuit, an I/O bus, a page buffer, and/or a sensing component, such as a sense amplifier). Memory cells 504 of different NAND strings 506 (e.g., one memory cell 504 per NAND string 506) may be coupled with one another via access lines 512 (sometimes called word lines or row lines, and shown as AL0-ALm) that select which row (or rows) of memory cells 504 is affected by a memory operation (e.g., a read operation or a write operation).

A NAND string 506 may be connected to a bit line 508 at one end and a common source line (CSL) 514 at the other end. A string select line (SSL) 516 may be used to control respective string select transistors 518. A string select transistor 518 selectively couples a NAND string 506 to a corresponding bit line 508. A ground select line (GSL) 520 may be used to control respective ground select transistors 522. A ground select transistor 522 selectively couples a NAND string 506 to the common source line 514.

A "page" of memory (or "a memory page") may refer to a group of memory cells 504 connected to the same access line 512, as shown by reference number 524. In some implementations (e.g., for single-level cells), the memory cells 504 connected to an access line 512 may be associated with a single page of memory. In some implementations (e.g., for multi-level cells), the memory cells 504 connected to an access line 512 may be associated with multiple pages of memory, where each page represents one bit stored in each of the memory cells 504 (e.g., a lower page that represents a first bit stored in each memory cell 504 and an upper page that represents a second bit stored in each memory cell 504). In NAND memory, a page is the smallest physically addressable data unit for a write operation (sometimes called a program operation).

In some implementations, a memory cell 504 is a floating-gate transistor memory cell. In this case, the memory cell 504 may include a channel 526, a source region 528, a drain region 530, a floating gate 532, and a control gate 534. The source region 528, the drain region 530, and the channel 526 may be on a substrate 536 (e.g., a semiconductor substrate). The memory device 120 may store a data state in the memory cell 504 by charging the floating gate 532 to a particular voltage associated with the data state and/or to a voltage that is within a range of voltages associated with the data state. This results in a predefined amount of current flowing through the channel 526 (e.g., from the source region 528 to the drain region 530) when a specified read voltage is applied to the control gate 534 (e.g., by a corresponding access line 512 connected to the control gate 534). Although not shown, a tunnel oxide layer (or tunnel dielectric layer) may be interposed between the floating gate 532 and the channel 526, and a gate oxide layer (e.g., a gate dielectric layer) may be interposed between the floating gate 532 and the control gate 534. As shown, a drain voltage Vd may be supplied from a bit line 508, a control gate voltage Vcg may be supplied from an access line 512, and a source voltage Vs may be supplied via the common source line 514 (which, in some implementations, is a ground voltage).

To write or program the memory cell 504, Fowler-Nordheim tunneling may be used. For example, a strong positive voltage potential may be created between the control gate 534 and the channel 526 (e.g., by applying a large positive voltage to the control gate 534 via a corresponding access line 512) while current is flowing through the channel 526 (e.g., from the common source line 514 to the bit line 508, or vice versa). The strong positive voltage at the control gate 534 causes electrons within the channel 526 to tunnel through the tunnel oxide layer and be trapped in the floating gate 532. These negatively charged electrons then act as an electron barrier between the control gate 534 and the channel 526 that increases the threshold voltage of the memory cell 504. The threshold voltage is a voltage required at the control gate 534 to cause current (e.g., a threshold amount of current) to flow through the channel 526. Fowler-Nordheim tunneling is an example technique for storing a charge in the floating gate, and other techniques, such as channel hot electron injection, may be used.

To read the memory cell 504, a read voltage may be applied to the control gate 534 (e.g., via a corresponding access line 512), and an I/O component 510 (e.g., a sense amplifier) may determine the data state of the memory cell 504 based on whether current passes through the memory cell 504 (e.g., the channel 526) due to the applied voltage. A pass voltage may be applied to all memory cells 504 (other than the memory cell 504 being read) in the same NAND string 506 as the memory cell 504 being read. For example, the pass voltage may be applied on each access line 512 other than the access line 512 of the memory cell 504 being read (e.g., where the read voltage is applied). The pass voltage is higher than the highest read voltage associated with any memory cell data states so that all of the other memory cells 504 in the NAND string 506 conduct, and the I/O component 510 can detect a data state of the memory cell 504 being read by sensing current (or lack thereof) on a corresponding bit line 508. For example, in a single-level memory cell that stores one of two data states, the data state is a "1" if current is detected, and the data state is a "0" if current is not detected. In a multi-level memory cell that stores one of three or more data states, multiple read voltages are applied, over time, to the control gate 534 to distinguish between the three or more data states and determine a data state of the memory cell 504.

To erase the memory cell 504, a strong negative voltage potential may be created between the control gate 534 and the channel 526 (e.g., by applying a large negative voltage to the control gate 534 via a corresponding access line 512). The strong negative voltage at the control gate 534 causes trapped electrons in the floating gate 532 to tunnel back across the oxide layer from the floating gate 532 to the channel 526 and to flow between the common source line 514 and the bit line 508. This removes the electron barrier between the control gate 534 and the channel 526 and decreases the threshold voltage of the memory cell 504 (e.g., to an empty or erased state, which may represent a "1").

As indicated above, FIG. 5 is provided as an example. Other examples may differ from what is described with regard to FIG. 5.

FIG. 6 is a flowchart of an example method 600 associated with preventing profiled side channel attacks. In some implementations, a host device (e.g., the host device 110) may perform or may be configured to perform the method 600. In some implementations, another device or a group of devices separate from or including the host device (e.g., the device-key configuration component 330 or the model generation component 340) may perform or may be configured to perform the method 600. Additionally, or alternatively, one or more components of the host device (e.g., the device-key configuration component 330 or the model generation component 340) may perform or may be configured to perform the method 600. Thus, means for performing the method 600 may include the host device and/or one or more components of the host device. Additionally, or alternatively, a non-transitory computer-readable medium may store one or more instructions that, when executed by the host device, cause the host device to perform the method 600.

As shown in FIG. 6, the method 600 may include obtaining a first profiling configuration that is based on a plurality of keys and one or more characteristics of a first memory device (block 610). As further shown in FIG. 6, the method 600 may include obtaining a second profiling configuration that is based on the plurality of keys and one or more characteristics of a second memory device (block 620). As further shown in FIG. 6, the method 600 may include generating a model based on the first profiling configuration and the second profiling configuration (block 630). As further shown in FIG. 6, the method 600 may include initiating a profiled side channel attack using the model (block 640).

The method 600 may include additional aspects, such as any single aspect or any combination of aspects described below and/or described in connection with one or more other methods or operations described elsewhere herein.

In a first aspect, obtaining the first profiling configuration comprises obtaining a first profiling configuration that is based on a first key of the plurality of keys, a second key of the plurality of keys, and the one or more characteristics of the first memory device, and wherein obtaining the second profiling configuration comprises obtaining a second profiling configuration that is based on the first key, the second key, and the one or more characteristics of the second memory device.

In a second aspect, alone or in combination with the first aspect, obtaining the first profiling configuration comprises obtaining a first portion of the first profiling configuration that is based on a first key of the plurality of keys and the one or more characteristics of the first memory device and a second portion of the first profiling configuration that is based on the first key, a second key of the plurality of keys, and the one or more characteristics of the first memory device, and wherein obtaining the second profiling configuration comprises obtaining a first portion of the second profiling configuration that is based on the first key and the one or more characteristics of the second memory device and a second portion of the second profiling configuration that is based on the first key, the second key, and the one or more characteristic of the second memory device.

In a third aspect, alone or in combination with one or more of the first and second aspects, obtaining the first profiling configuration comprises obtaining a third portion of the first profiling configuration that is based on the first key, the second key, a third key of the plurality of keys, and the one or more characteristics of the first memory device, and wherein obtaining the second profiling configuration comprises obtaining a third portion of the second profiling configuration that is based on the first key, the second key, the third key, and the one or more characteristics of the second memory device.

In a fourth aspect, alone or in combination with one or more of the first through third aspects, the method 600 includes obtaining a third profiling configuration that is based on the plurality of keys and one or more characteristics of a third memory device, and wherein generating the model comprises generating the model based on the first profiling configuration, the second profiling configuration, and the third profiling configuration.

In a fifth aspect, alone or in combination with one or more of the first through fourth aspects, the method 600 includes determining a countermeasure for preventing another profiled side channel attack based on performing the profiled side channel attack.

In a sixth aspect, alone or in combination with one or more of the first through fifth aspects, the method 600 includes transmitting, to the first memory device, the second memory device, or a third memory device, an indication of the countermeasure for preventing another profiled side channel attack.

In a seventh aspect, alone or in combination with one or more of the first through sixth aspects, the first profiling configuration and the second profiling configuration are based on the same keys of the plurality of keys.

In an eighth aspect, alone or in combination with one or more of the first through seventh aspects, the first profiling configuration is based on a first set of keys of the plurality of keys and the second profiling configuration is based on a second set of keys of the plurality of keys, wherein the second set of keys includes at least one key that is not included in the first set of keys.

In a ninth aspect, alone or in combination with one or more of the first through eighth aspects, initiating the profiled side channel attack comprises performing the profiled side channel attack on the first memory device, the second memory device, or a third memory device.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a host device includes one or more components configured to: obtain a first profiling configuration that is based on a plurality of keys and one or more characteristics of a first memory device; obtain a second profiling configuration that is based on the plurality of keys and one or more characteristics of a second memory device; generate a model based on the first profiling configuration and the second profiling configuration; and initiate a profiled side channel attack using the model.

In some implementations, a method performed by a host device includes obtaining a first profiling configuration that is based on a plurality of keys and one or more characteristics of a first memory device; obtaining a second profiling configuration that is based on the plurality of keys and one or more characteristics of a second memory device; generating a model based on the first profiling configuration and the second profiling configuration; and initiating a profiled side channel attack using the model.

In some implementations, an apparatus includes means for obtaining a first profiling configuration that is based on a first key and one or more characteristics of a first memory device; means for obtaining a second profiling configuration that is based on the first key, a second key, and the one or more characteristics of the first memory device; means for obtaining a third profiling configuration that is based on the first key and one or more characteristics of a second memory device; means for obtaining a fourth profiling configuration that is based on the first key, the second key, and the one or more characteristics of the second memory device; and means for generating a model based on the first profiling configuration, the second profiling configuration, the third profiling configuration, and the fourth profiling configuration.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A host device, comprising:
memory; and
a controller configured to:
obtain a first profiling configuration that is based on a plurality of keys and one or more characteristics of a first memory device, the one or more characteristics of the first memory device corresponding to the first memory device performing cryptographic operations using the plurality of keys, wherein:
a first portion of the first profiling configuration is based on a first key of the plurality of keys and the one or more characteristics of the first memory device, and
a second portion of the first profiling configuration is based on the first key, a second key of the plurality of keys, and the one or more characteristics of the first memory device;
obtain a second profiling configuration that is based on the plurality of keys and one or more characteristics of a second memory device, the one or more characteristics of the second memory device corresponding to the second memory device performing cryptographic operations using the plurality of keys, wherein:
a first portion of the second profiling configuration is based on the first key and the one or more characteristics of the second memory device, and
a second portion of the second profiling configuration is based on the first key, the second key, and the one or more characteristics of the second memory device;
generate a model based on the first profiling configuration and the second profiling configuration; and
initiate a profiled side channel attack using the model.

2. The host device of claim 1, wherein the controller, to obtain the first profiling configuration, is configured to obtain a first profiling configuration that is based on a first key of the plurality of keys, a second key of the plurality of keys, and the one or more characteristics of the first memory device, and wherein the controller, to obtain the second profiling configuration, is configured to obtain a second profiling configuration that is based on the first key, the second key, and the one or more characteristics of the second memory device.

3. The host device of claim 1, wherein the controller, to obtain the first profiling configuration, is further configured to obtain a third portion of the first profiling configuration that is based on the first key, the second key, a third key of the plurality of keys, and the one or more characteristics of the first memory device, and wherein the controller, to obtain the second profiling configuration, is further configured to obtain a third portion of the second profiling configuration that is based on the first key, the second key, the third key, and the one or more characteristics of the second memory device.

4. The host device of claim 1, wherein the controller is further configured to obtain a third profiling configuration that is based on the plurality of keys and one or more characteristics of a third memory device, and wherein the controller, to generate the model, is configured to generate the model based on the first profiling configuration, the second profiling configuration, and the third profiling configuration.

5. The host device of claim 1, wherein the controller is further configured to:
determine a countermeasure for preventing another profiled side channel attack; and
transmit, to the first memory device, the second memory device, or a third memory device, an indication of the countermeasure for preventing another profiled side channel attack.

6. The host device of claim 1, wherein the first profiling configuration and the second profiling configuration are based on the same keys of the plurality of keys.

7. The host device of claim 1, wherein the first profiling configuration is based on a first set of keys of the plurality of keys and the second profiling configuration is based on a second set of keys of the plurality of keys, wherein the second set of keys includes at least one key that is not included in the first set of keys.

8. A method performed by a host device, comprising:
obtaining a first profiling configuration that is based on a plurality of keys and one or more characteristics of a first memory device, the one or more characteristics of the first memory device corresponding to the first memory device performing cryptographic operations using the plurality of keys, wherein:
a first portion of the first profiling configuration is based on a first key of the plurality of keys and the one or more characteristics of the first memory device, and
a second portion of the first profiling configuration is based on the first key, a second key of the plurality of keys, and the one or more characteristics of the first memory device;
obtaining a second profiling configuration that is based on the plurality of keys and one or more characteristics of a second memory device, the one or more characteristics of the second memory device corresponding to the second memory device performing cryptographic operations using the plurality of keys, wherein
a first portion of the second profiling configuration is based on the first key and the one or more characteristics of the second memory device, and
a second portion of the second profiling configuration that is based on the first key, the second key, and the one or more characteristic of the second memory device;
generating a model based on the first profiling configuration and the second profiling configuration; and
initiating a profiled side channel attack using the model.

9. The method of claim 8, wherein obtaining the first profiling configuration comprises obtaining a first profiling configuration that is based on a first key of the plurality of keys, a second key of the plurality of keys, and the one or more characteristics of the first memory device, and wherein obtaining the second profiling configuration comprises obtaining a second profiling configuration that is based on the first key, the second key, and the one or more characteristics of the second memory device.

10. The method of claim 8, wherein obtaining the first profiling configuration comprises obtaining a third portion of the first profiling configuration that is based on the first key, the second key, a third key of the plurality of keys, and the one or more characteristics of the first memory device, and wherein obtaining the second profiling configuration comprises obtaining a third portion of the second profiling configuration that is based on the first key, the second key, the third key, and the one or more characteristics of the second memory device.

11. The method of claim 8, further comprising obtaining a third profiling configuration that is based on the plurality of keys and one or more characteristics of a third memory device, and wherein generating the model comprises generating the model based on the first profiling configuration, the second profiling configuration, and the third profiling configuration.

12. The method of claim 8, further comprising:

determining a countermeasure for preventing another profiled side channel attack based on performing the profiled side channel attack; and transmitting, to the first memory device, the second memory device, or a third memory device, an indication of the countermeasure for preventing another profiled side channel attack.

13. The method of claim 8, wherein the first profiling configuration and the second profiling configuration are based on the same keys of the plurality of keys.

14. The method of claim 8, wherein the first profiling configuration is based on a first set of keys of the plurality of keys and the second profiling configuration is based on a second set of keys of the plurality of keys, wherein the second set of keys includes at least one key that is not included in the first set of keys.

15. An apparatus, comprising:

means for obtaining a first profiling configuration that is based on a first key and one or more characteristics of a first memory device, the one or more characteristics of the first memory device corresponding to the first memory device performing cryptographic operations using at least the first key;

means for obtaining a second profiling configuration that is based on the first key, a second key, and the one or more characteristics of the first memory device;

means for obtaining a third profiling configuration that is based on the first key and one or more characteristics of a second memory device, the one or more characteristics of the second memory device corresponding to the first memory device performing cryptographic operations using at least the first key;

means for obtaining a fourth profiling configuration that is based on the first key, the second key, and the one or more characteristics of the second memory device;

means for generating a model based on the first profiling configuration, the second profiling configuration, the third profiling configuration, and the fourth profiling configuration; and means for performing a profiled side channel attack using the model.

16. The apparatus of claim 15, further comprising:

means for obtaining a fifth profiling configuration that is based on the first key, the second key, a third key, and the one or more characteristics of the first memory device;

means for obtaining a sixth profiling configuration that is based on the first key, the second key, the third key, and the one or more characteristics of the second memory device; and means for generating a model based on the first profiling configuration, the second profiling configuration, the third profiling configuration, the fourth profiling configuration, the fifth profiling configuration, and the sixth profiling configuration.

17. The apparatus of claim 15, further comprising:

means for obtaining a fifth profiling configuration that is based on the first key and one or more characteristics of a third memory device;

means for obtaining a sixth profiling configuration that is based on the first key, the second key, and the one or more characteristics of the third memory device; and means for generating a model based on the first profiling configuration, the second profiling configuration, the third profiling configuration, the fourth profiling configuration, the fifth profiling configuration, and the sixth profiling configuration.

18. The apparatus of claim 15, further comprising:

means for determining a countermeasure for preventing another profiled side channel attack; and means for transmitting, to the first memory device, the second memory device, or a third memory device, an indication of the countermeasure for preventing another profiled side channel attack.

19. The apparatus of claim 15, wherein the first profiling configuration and the second profiling configuration are based on the same keys.

20. The apparatus of claim 15, wherein the first profiling configuration is based on a first set of keys and the second profiling configuration is based on a second set of keys, wherein the second set of keys includes at least one key that is not included in the first set of keys.

* * * * *